US009707937B2

United States Patent
Kim et al.

(10) Patent No.: US 9,707,937 B2
(45) Date of Patent: Jul. 18, 2017

(54) WASHER NOZZLE INTEGRATED WIPER BLADE

(71) Applicants: Hyundai Motor Company, Seoul (KR); KCW Corporation, Daegu (KR)

(72) Inventors: Hyun Sub Kim, Seoul (KR); Bock Cheol Lee, Suwon-si (KR); Nak Kyoung Kong, Seongnam-si (KR); Young Sub Oh, Suwon-si (KR); Jin Hee Lee, Seoul (KR); Jin Wan Park, Daegu (KR); Ji Yong Jeong, Daegu (KR); Je Seong Lee, Daegu (KR); Jae Hyuck An, Daegu (KR)

(73) Assignees: Hyundai Motor Company, Seoul (KR); KCW Corporation, Daegu (KR)

( * ) Notice: Subject to any disclaimer, the term of this patent is extended or adjusted under 35 U.S.C. 154(b) by 396 days.

(21) Appl. No.: 14/570,942

(22) Filed: Dec. 15, 2014

(65) Prior Publication Data
US 2016/0082930 A1 Mar. 24, 2016

(30) Foreign Application Priority Data
Sep. 24, 2014 (KR) .................. 10-2014-0127531

(51) Int. Cl.
*B60S 1/38* (2006.01)
*B60S 1/52* (2006.01)

(52) U.S. Cl.
CPC .............. *B60S 1/524* (2013.01); *B60S 1/381* (2013.01); *B60S 1/3801* (2013.01); *B60S 1/3806* (2013.01); *B60S 2001/3843* (2013.01)

(58) Field of Classification Search
CPC ...................................... B60S 1/524

USPC ...................................... 15/250.04
See application file for complete search history.

(56) References Cited

U.S. PATENT DOCUMENTS 8,381,348 B2   2/2013   Egner-Walter et al.

FOREIGN PATENT DOCUMENTS

| JP | 5-5626 U | 1/1993 |
| JP | 2007-30565 A | 2/2007 |
| JP | 2007-112392 A | 5/2007 |
| KR | 20-1998-0040490 | 9/1998 |
| KR | 20-1998-055345 | 10/1998 |
| KR | 10-0230949 B1 | 11/1999 |
| KR | 20-1999-0040083 U | 11/1999 |
| KR | 20-0238724 | 9/2001 |
| KR | 10-2006-0116315 | 11/2006 |

(Continued)

*Primary Examiner* — Andrew A Horton
(74) *Attorney, Agent, or Firm* — Morgan Lewis & Bockius LLP

(57) ABSTRACT

A wiper blade with integral washer nozzles including a blade rubber for wiping a glass of a vehicle, a spoiler combined with a retainer of a wiper arm, secondary levers combined with the spoiler, and yokes combined with the secondary levers, respectively, and supporting the blade rubber, may have a washer nozzle module integrally combined with the spoiler and spraying washer fluid supplied through washer fluid hoses in two directions with respect to the spoiler, wherein the washer nozzle module has washer fluid channels formed therein in a longitudinal direction of the spoiler to spray the washer fluid in two directions, nozzles formed along the washer fluid channels and spraying the washer fluid supplied through the washer fluid channels, and inlets communicating with the washer fluid channels, respectively, and connected with the washer fluid hoses for supplying the washer fluid.

9 Claims, 9 Drawing Sheets

(56) References Cited

FOREIGN PATENT DOCUMENTS

| | | |
|---|---|---|
| KR | 10-2010-0064983 | 6/2010 |
| KR | 10-0974702 | 8/2010 |
| KR | 10-0974703 | 8/2010 |
| KR | 10-2011-0040262 | 4/2011 |
| KR | 10-1241155 | 3/2013 |
| WO | WO 2009/118286 | 10/2009 |

'A-A' cross-sectional view

'B-B' cross-sectional view    'C-C' cross-sectional view    'D-D' cross-sectional view

WASHER NOZZLE INTEGRATED WIPER BLADE

CROSS-REFERENCE TO RELATED APPLICATION

The present application claims priority to Korean Patent Application No. 10-2014-0127531 filed on Sep. 24, 2014, the entire contents of which is incorporated herein for all purposes by this reference.

BACKGROUND OF THE INVENTION

Field of the Invention

The present invention relates to an automotive wiper blade with a spoiler. More particularly, it relates to a wiper blade with integral washer nozzles which can selectively spray washer fluid in only the motion direction of the blade and accordingly improve the problem of obstructing the view due to the washer fluid.

Description of Related Art

In general, vehicles are equipped with a wiper to remove snow, rain, and dirt on the windshield glass and the rear window glass and the wiper, which is a device for wiping a glass surface with a wiper blade operated by a wiper motor, ensures the visual field of a driver.

According to a common wiper, when torque from a wiper motor is transmitted to a pivot unit and a wiper arm through a link, the wiper arm repeats swinging left and right within a predetermined range of angle and a wiper blade at the free end of the wiper arm moves and wipes a glass surface.

A blade rubber at the end of the wiper blade removes rain or other dirt on a glass surface by moving in close contact with the surface of the glass.

According to those wiper blades, the spoiler applies a downward force to the wiper blades, so the wiper blades are not damaged and chattering is prevented accordingly.

FIG. 1 is an exploded perspective view of a wiper blade with a spoiler. As shown in the figure, the wiper blade includes a blade rubber 40 wiping a windshield glass or a rear window glass of a vehicle in close contact with it, a spoiler (cover) 10 connected with a wiper arm 50, secondary levers 20 connected to both sides of the spoiler 10, and yokes 30 combined with the secondary levers 20 and supporting the blade rubber 40.

When the wiper blades wipes a curved glass surface, the angles between the yokes 30 supporting the blade rubber 40 and the secondary levers 20 change about high shafts, so the blade rubber 40 wipes a glass surface, bending like a bow.

Further, the spoiler 10 brings the blade rubber 40 in close contact with a glass surface by applying a downward force to the wiper blade, so damage to the wiper blade and chattering may be effectively prevented.

Meanwhile, vehicles have washer fluid spray system that sprays washer fluid to a glass surface to more easily remove dirt in the process of washing the surface of the windshield glass.

According to the washer fluid spray system, washer fluid in a reservoir is pumped up by a washer pump and sprayed to glass through spray nozzles. In the related art, since spray nozzles are disposed inside the cowl top of the hood, the spraying direction of washer fluid is fixed and the washer fluid is sprayed only to predetermined positions on a glass surface regardless of the position of the wiper blade.

Accordingly, before the wiper blade passes, the washer fluid on the glass surface obstructs the view of a driver and flows down on the glass without being removed by the wiper blade, so the glass is not completely wiped and the washer fluid flowing down may soil the car body.

Further, since the spray nozzles are disposed inside the cowl top or the hood, the washer fluid may be sprayed out of the operation range of the wiper blade, so a large amount of washer fluid is consumed. In addition, since the distance between the glass and the spray nozzles is large, the washer fluid is greatly influenced by air and can be sprayed not to desired positions, but to unexpected positions, when a vehicle runs at a high speed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wiper blade that can selectively spray washer blades in only the motion direction of the blade and solve the problem of obstructing the view with washer fluid, when a wiper operates, by having a spoiler and integral spray nozzles.

Various aspects of the present invention are directed to providing a wiper blade that can spray washer fluid exactly within a wiping area, reduce waste of washer fluid, and prevent poor spraying of washer fluid due to air flow when a vehicle runs at a high speed, by spraying washer fluid through integral nozzles.

In an aspect of the present invention, a wiper blade with integral washer nozzles including a blade rubber for wiping a glass of a vehicle, a spoiler combined with a retainer of a wiper arm, secondary levers combined with the spoiler, and yokes combined with the secondary levers, respectively, and supporting the blade rubber, may include a washer nozzle module integrally combined with the spoiler and spraying washer fluid supplied through washer fluid hoses in two directions with respect to the spoiler wherein the washer nozzle module may have washer fluid channels formed therein in a longitudinal direction of the spoiler to spray the washer fluid in two directions, nozzles formed along the washer fluid channels and spraying the washer fluid supplied through the washer fluid channels, and inlets communicating with the washer fluid channels, respectively, and connected with the washer fluid hoses for supplying the washer fluid.

The washer nozzle module may include a nozzle body and a nozzle cover that form the washer fluid channels by being combined with each other, parallel channel grooves that communicate with the inlets, respectively, are formed on the nozzle body, and the nozzle cover is combined with the nozzle body and covers bottoms of the channel grooves so that the channel grooves are sealed by the nozzle cover to form the washer fluid channels.

The nozzles protruding for spraying the washer fluid are formed with predetermined intervals on the nozzle cover and arranged at both sides of the spoiler to spray the washer fluid downward from the nozzle cover.

In the nozzles, the nozzles at a longitudinal center of the spoiler are set to spray the washer fluid upward and another nozzles are set to spray the washer fluid at an angle back and forth with respect to the longitudinal direction of the nozzle cover.

The nozzle body is integrally combined with the spoiler.

Washer fluid hoses through which the washer fluid is supplied by pumps that are independently driven and controlled are connected to the inlets, respectively, so the washer fluid is sprayed through only the nozzles in any one of the two washer fluid channels while the washer pumps are sequentially driven in accordance with a motion direction of the wiper blade.

The washer nozzle module is coupled to a top of the spoiler and a seat in which the washer nozzle module is seated is formed in a shape of a groove longitudinally on a top of a center spoiler.

The washer nozzle module is seated in the seat of the spoiler by sliding, seat projections are formed on left and right sides of the seat, locking-projections protrude inward at left and right sides of a bottom of the washer nozzle module, so the washer nozzle is combined by sliding such that the locking-projections are fitted in between the seat projections and a seating side of the seat on which the bottom of the washer nozzle module slides.

The washer nozzle module is combined by sliding, with the locking-projections fitted in between the seating side and the seat projections, a protrusion form in the seat of the spoiler is inserted in a fitting hole of the washer nozzle module to restrict the washer nozzle module.

According to the wiper blade with integral washer nozzle of the present invention, since integral nozzles are provided, it is possible to selectively spray washer fluid in only the motion direction of the blade when a wiper operates, so it is possible to solve the problem of obstructing the view due to washer fluid.

Further, it is possible spray washer fluid exactly within a wiping area, reduce waste of washer fluid, and prevent poor spraying of washer fluid due to air flow when a vehicle runs at a high speed.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
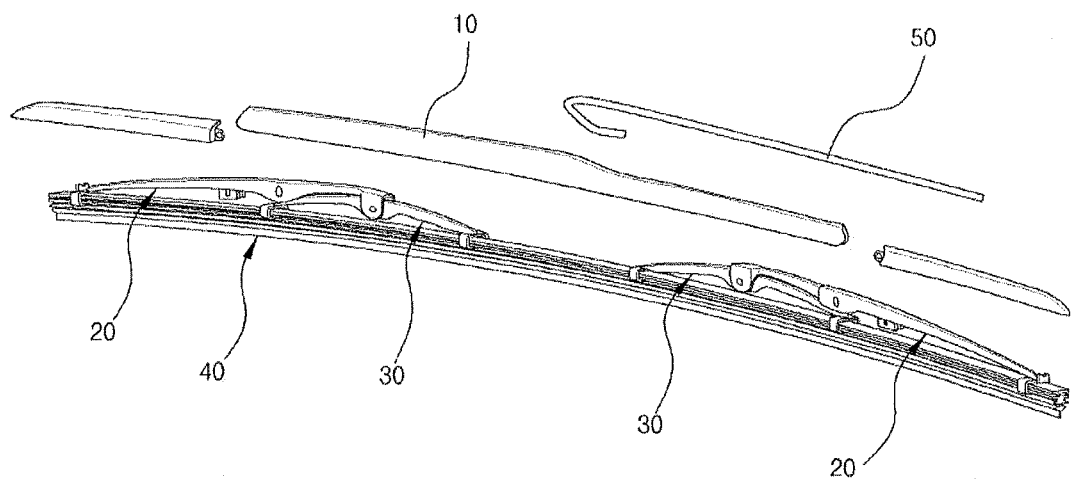
FIG. 1 is a perspective view showing the configuration of a wiper blade with a spoiler of the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but also various alternatives, modifications, equivalents and other embodiments, which may be included within the spirit and scope of the invention as defined by the appended claims.

The following examples illustrate the invention and are not intended to limit the same.

Hereinafter, the present invention will be described more fully with reference to the accompanying drawings for those skilled in the art to easily implement the present invention.

The present invention has been made in effort to solve the problems with the existing wiper blades having a spoiler and is characterized in that a separate wiper nozzle module for spraying washer fluid is integrally combined with a spoiler, in a wiper blade with a spoiler, that is, a so-called S-blade.

Figure 2:
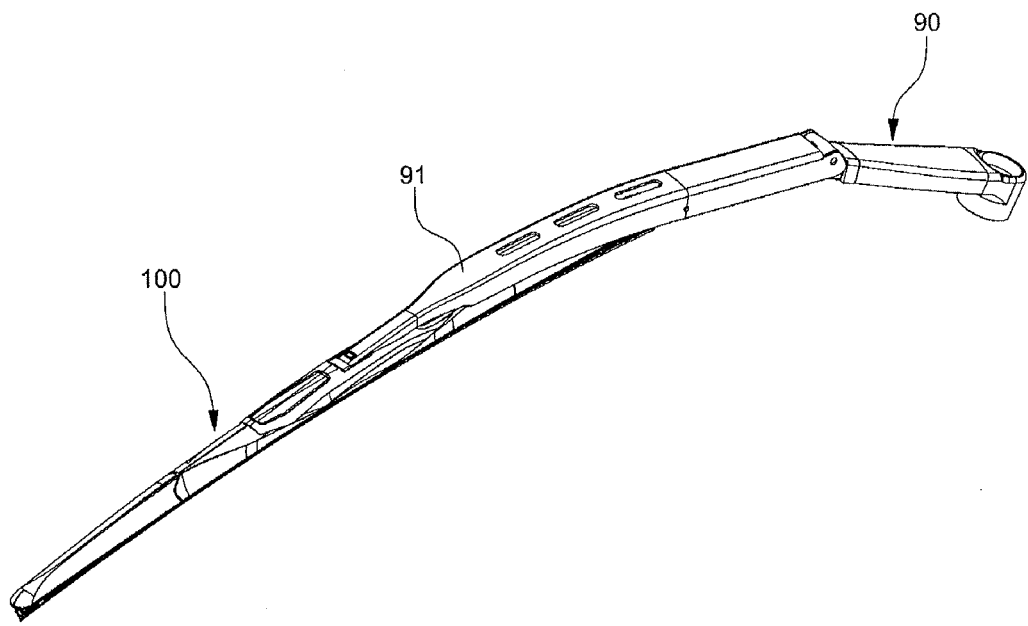
FIG. 2 is a perspective view showing an assembly of a wiper arm and a wiper blade according to an exemplary embodiment of the present invention.
Figure 3:
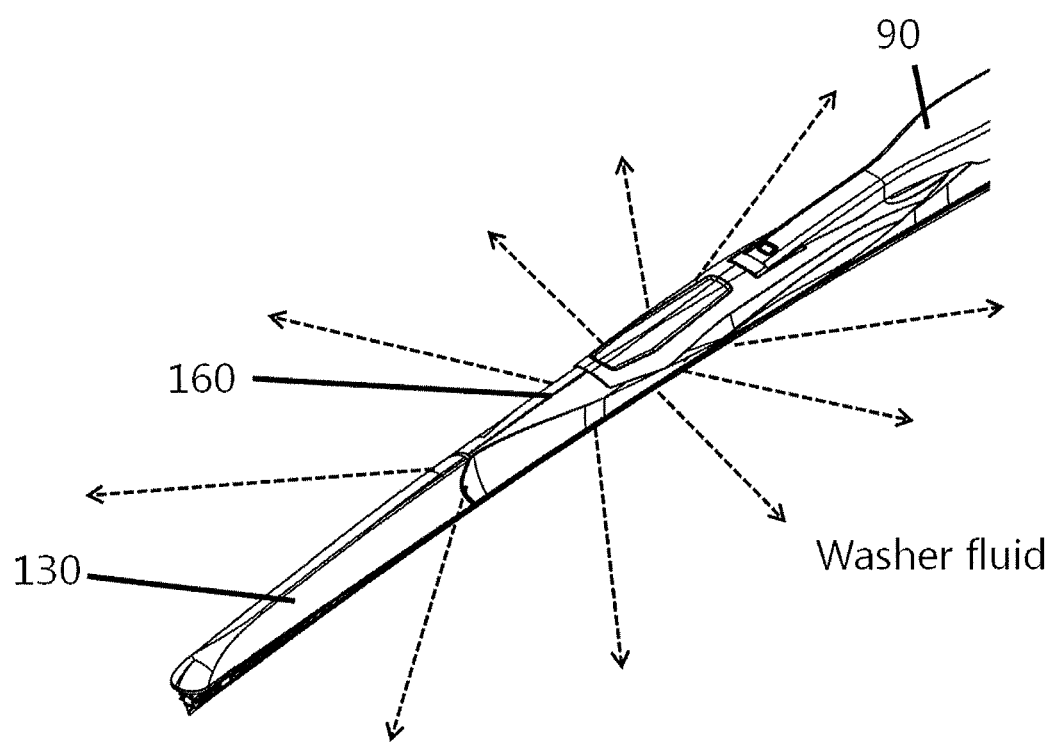
FIG. 3 is a perspective view showing washer fluid sprayed from a washer nozzle module of the wiper blade according to an exemplary embodiment of the present invention.

FIG. 2 is a perspective view showing an assembly of a wiper arm 90 and a wiper blade 100 according to an exemplary embodiment of the present invention and FIG. 3 is a perspective view showing washer fluid sprayed from a washer nozzle module 160 of the wiper blade 100 according to an exemplary embodiment of the present invention.

Figure 4:
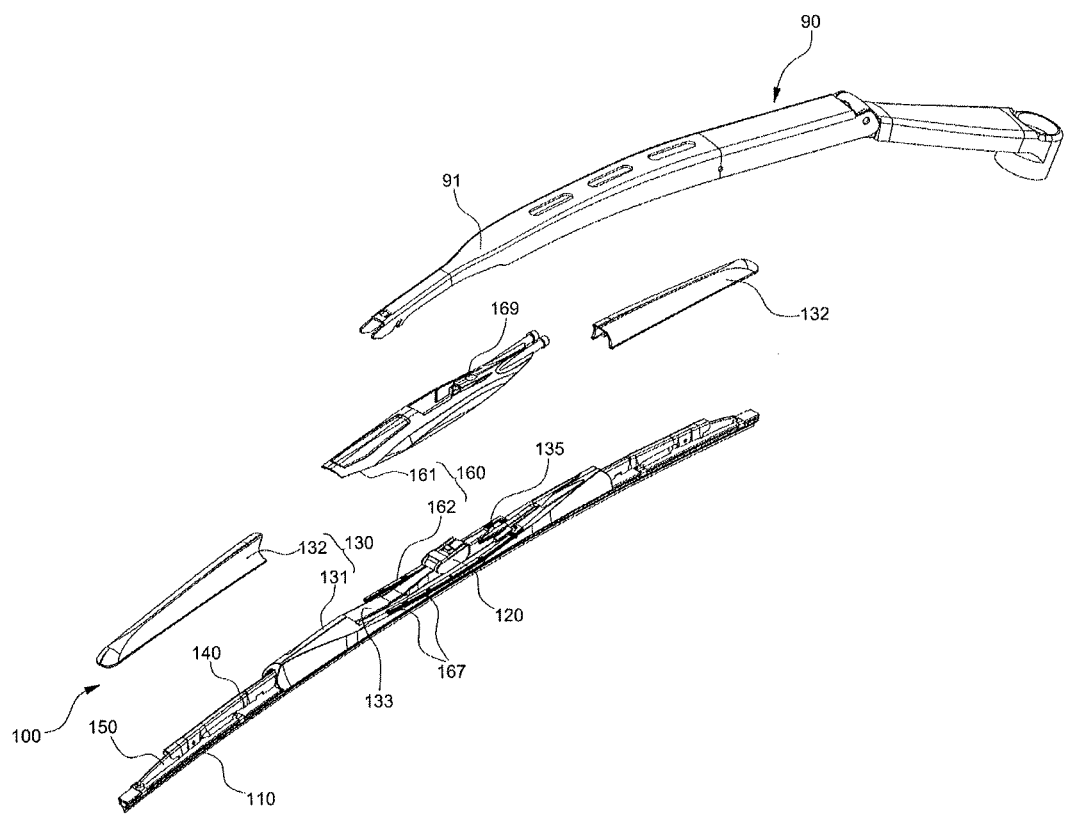
FIG. 4 is a perspective view of a spoiler, the washer nozzle module, and the wiper arm separated from the wiper blade according to an exemplary embodiment of the present invention.
Figure 5:
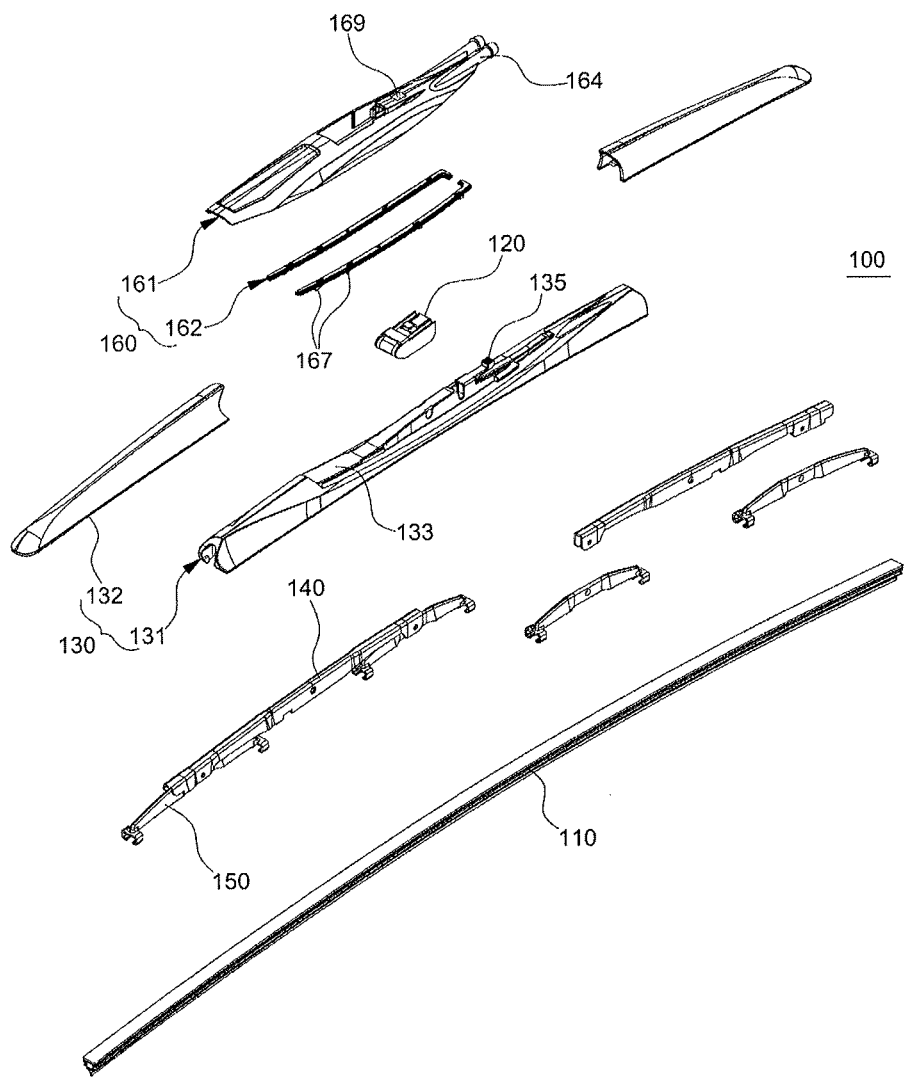
FIG. 5 is an exploded perspective view of the wiper blade according to an exemplary embodiment of the present invention.

FIG. 4 is a perspective view of a spoiler 130, the washer nozzle module 160, and the wiper arm 90 separated from the wiper blade according to an exemplary embodiment of the present invention and FIG. 5 is an exploded perspective view of the wiper blade 100 according to an exemplary embodiment of the present invention.

Figure 6:
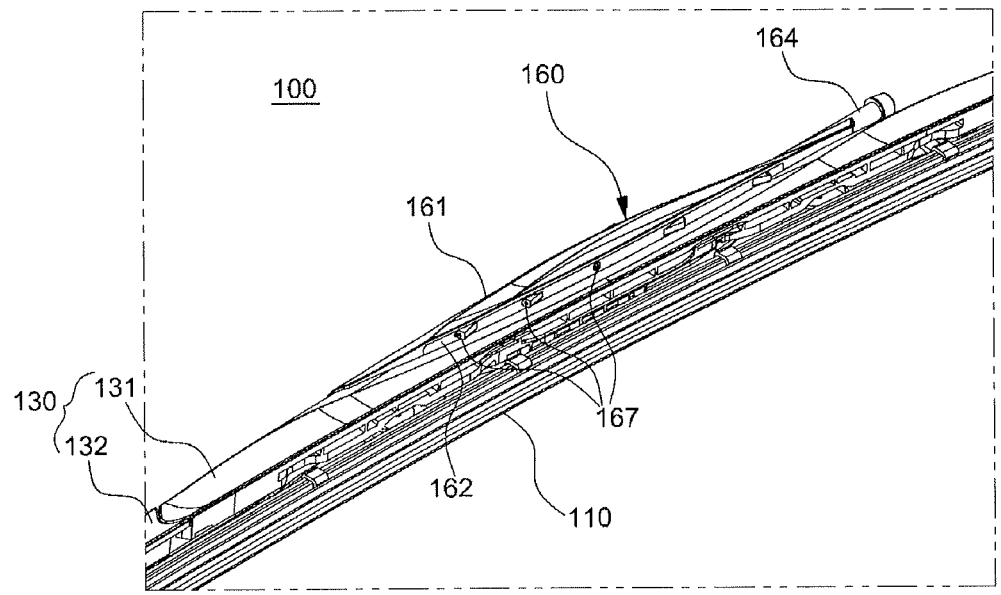
FIG. 6 is a bottom view of the wiper blade equipped with the washer nozzle module according to an exemplary embodiment of the present invention.
Figure 7:
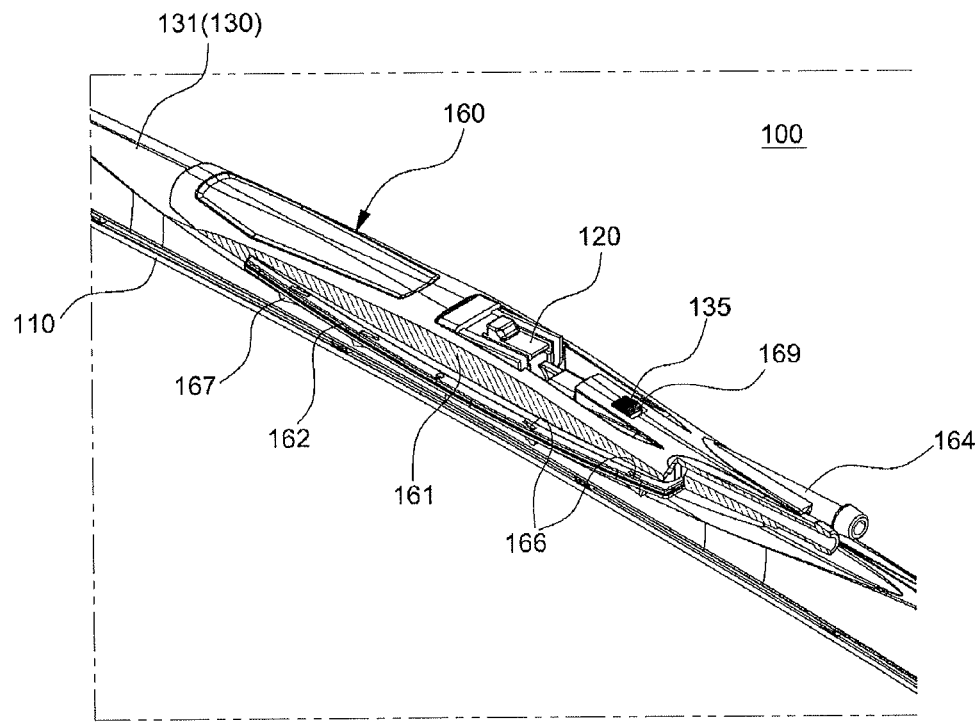
FIG. 7 and FIG. 8 are partial cut views showing a nozzle body of the washer nozzle module of the wiper blade according to an exemplary embodiment of the present invention.
Figure 8:
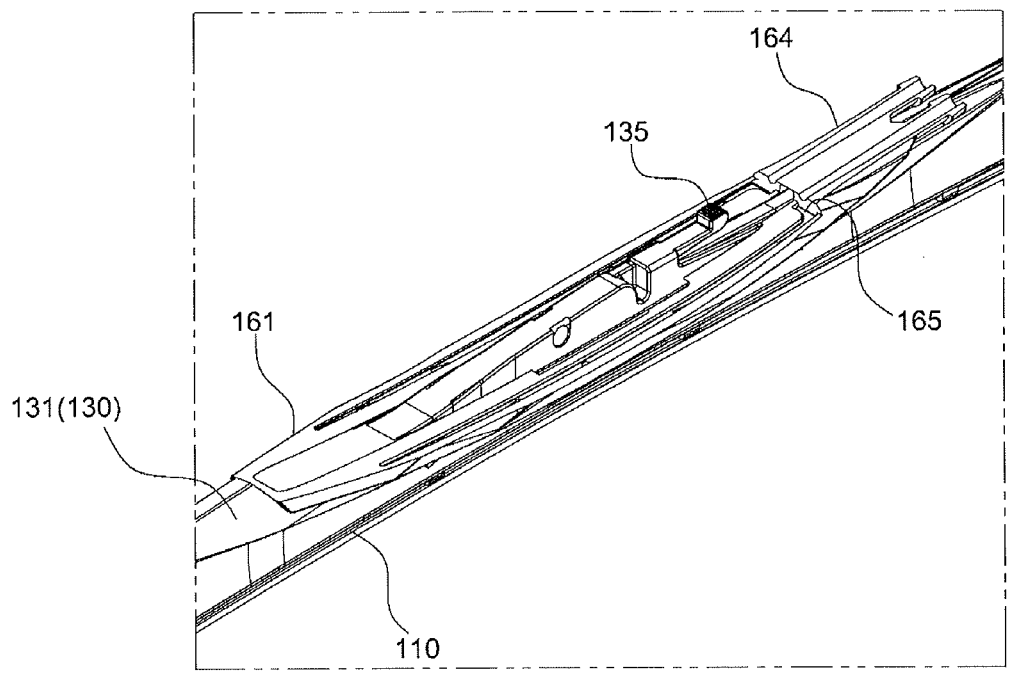

FIG. 6 is a bottom view of the wiper blade 100 equipped with the washer nozzle module 160 according to an exemplary embodiment of the present invention and FIG. 7 and FIG. 8 are partial cut views showing a nozzle body 161 of the washer nozzle module 160 of the wiper blade 100 according to an exemplary embodiment of the present invention.

Figure 9:
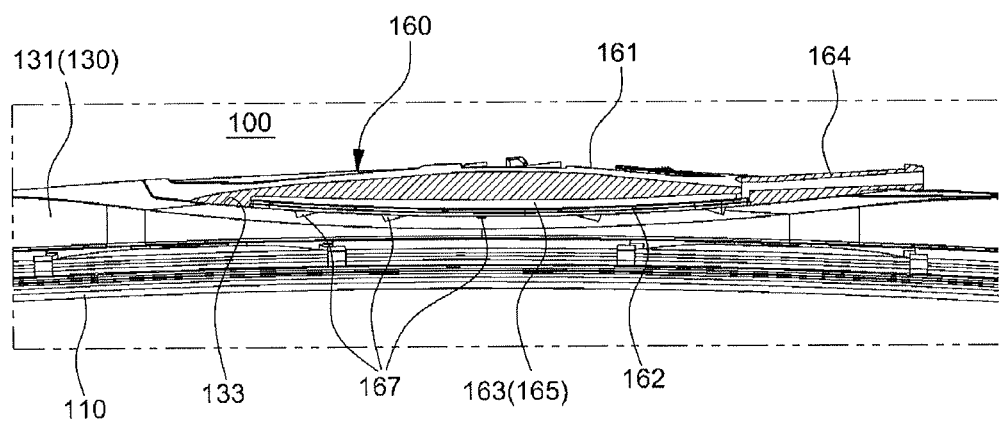
FIG. 9 and FIG. 10 are vertical cross-sectional views showing the nozzle body of the washer nozzle module of the wiper blade according to an exemplary embodiment of the present invention.
Figure 10:
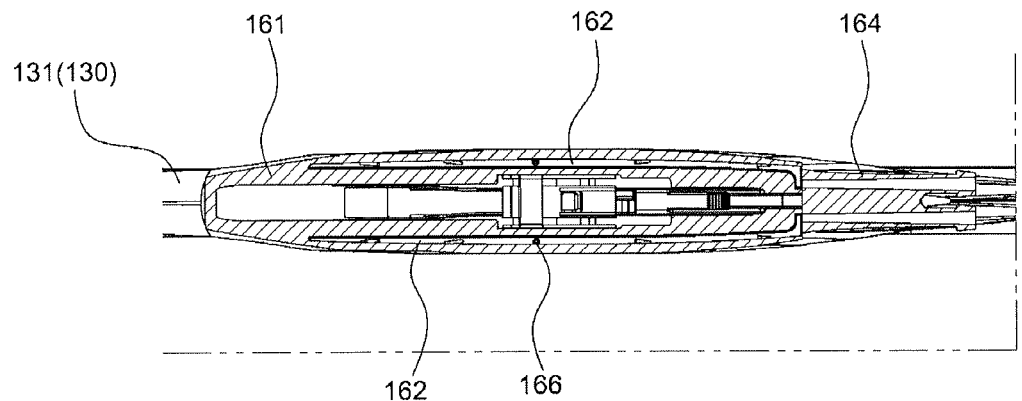
Figure 11A:
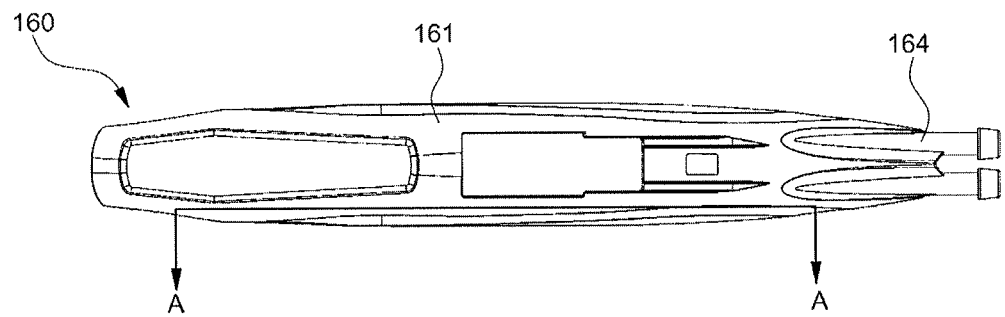
FIG. 11A, FIG. 11B, and FIG. 11C are a plan view, a bottom view, and a cross-sectional view, respectively, showing the washer nozzle module of the wiper blade according to an exemplary embodiment of the present invention.
Figure 11B:
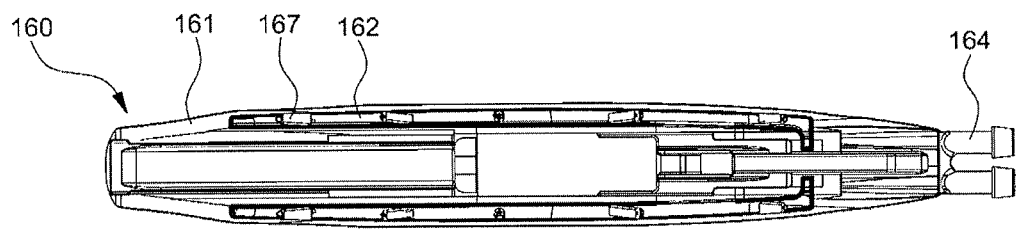
Figure 11C:
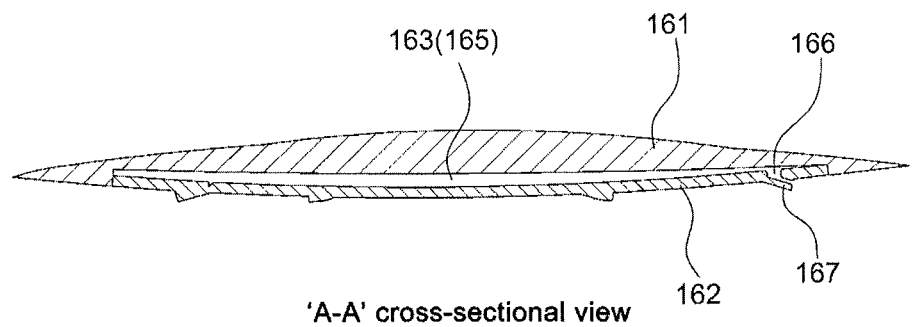

FIG. 9 and FIG. 10 are vertical cross-sectional views showing the nozzle body 161 of the washer nozzle module 160 of the wiper blade 100 according to an exemplary embodiment of the present invention and FIG. 11A, FIG. 11B, and FIG. 11C are a plan view, a bottom view, and a cross-sectional view, respectively, showing the washer nozzle module 160 of the wiper blade 100 according to an exemplary embodiment of the present invention.

Figure 12:
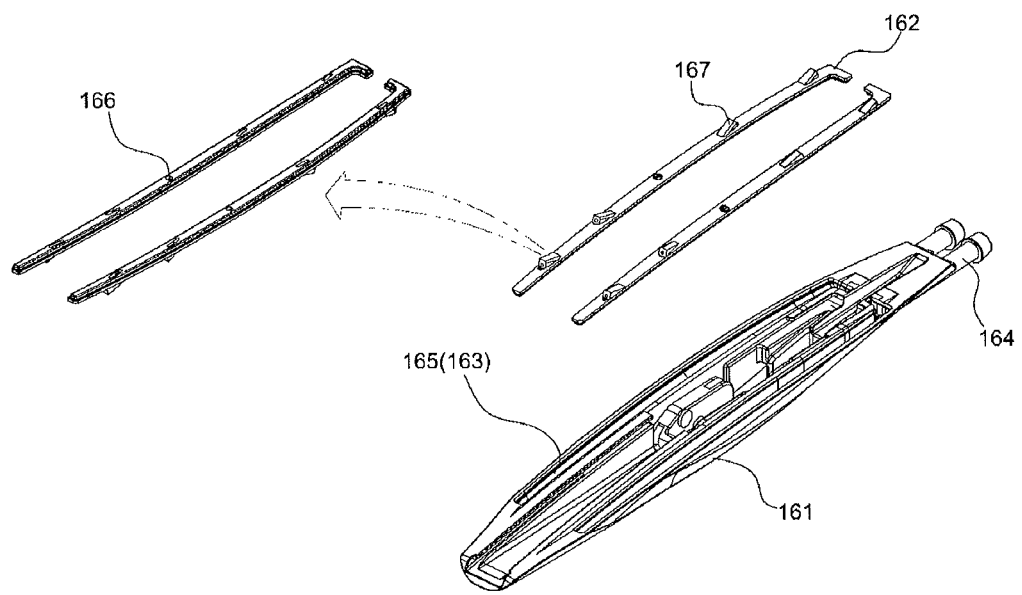
FIG. 12 is an exploded perspective view of the washer nozzle module of the wiper blade according to an exemplary embodiment of the present invention.
Figure 13:
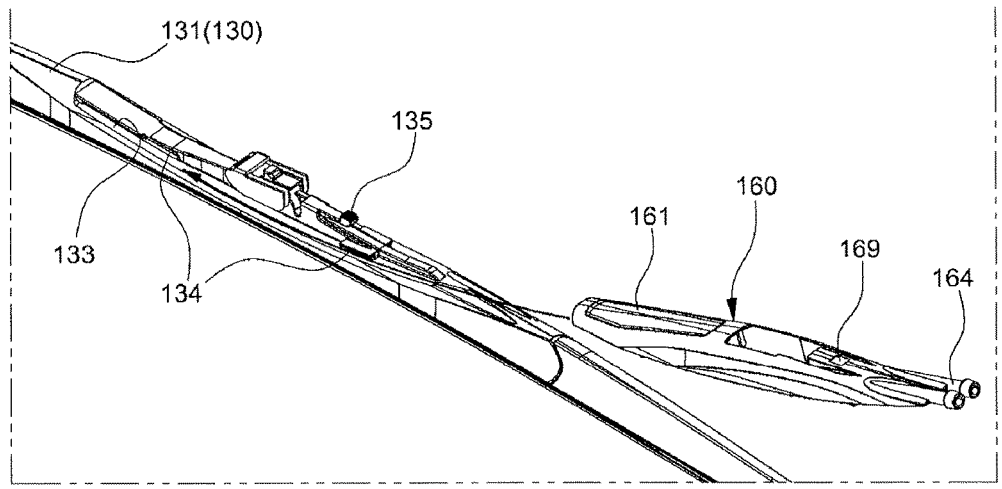
FIG. 13 is a view showing a way of assembling the washer nozzle module of the wiper blade according to an exemplary embodiment of the present invention.
Figure 14:
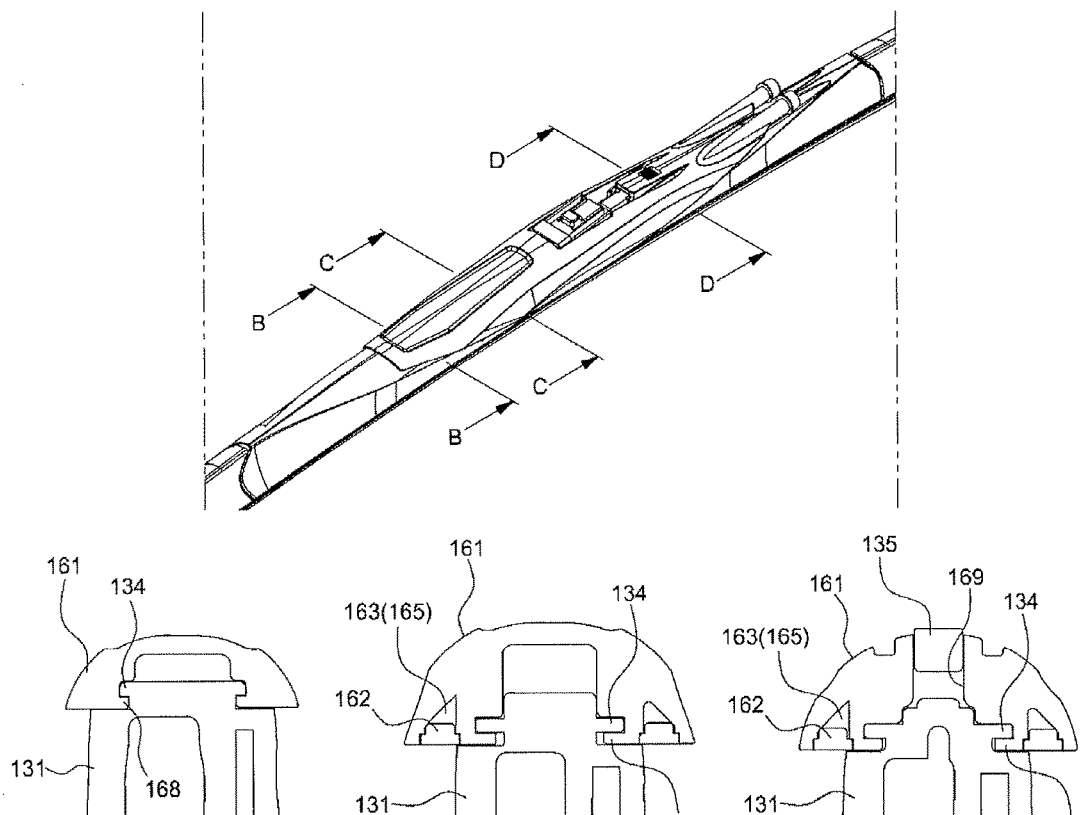
FIG. 14 is a cross-sectional of several parts of the washer nozzle module combined with the wiper blade according to an exemplary embodiment of the present invention.

FIG. 12 is an exploded perspective view of the washer nozzle module 160 of the wiper blade 100 according to an exemplary embodiment of the present invention, FIG. 13 is a view showing a way of assembling the washer nozzle module 160 of the wiper blade 100 according to an exemplary embodiment of the present invention, and FIG. 14 is a cross-sectional of several parts of the washer nozzle module 160 combined with the wiper blade 100 according to an exemplary embodiment of the present invention.

As shown in the figures, the wiper blade 100 of the present invention has a spoiler 130 and includes a blade rubber 110 that wipes a windshield glass or a rear window glass of a vehicle in close contact with it, a spoiler 130 to which a retainer 91 of a wiper arm 90 is coupled through a connector 120, secondary levers 140 that are coupled to both sides of the spoiler 130, and yokes 150 that are combined with the secondary levers 140 and support the blade rubber 110.

The spoiler 130 may have a structure formed by coupling side spoilers 132 integrally to both sides of a center spoiler 130.

The wiper blade of the present invention further includes a washer nozzle module 160 that is combined with a spoiler 130 and capable of spraying washer fluid, which is supplied through a washer fluid hose, to the left and right of the spoiler 130.

The washer nozzle module 160 may be disposed at the longitudinal center of the spoiler 130, and preferably, may be disposed at the center of the center spoiler 131.

To dispose washer nozzle module 160 at the top of the center of the center spoiler 131, a seat 133 where the washer nozzle module 160 is seated is formed in the shape of a groove longitudinally on the top of the center spoiler 131.

As the washer nozzle module 160 that can spray washer fluid at an angle, which will be described below, is disposed integrally at the center of the wiper blade 100, in detail, at the center of the center spoiler 131, it is possible to spray washer fluid uniformly throughout the longitudinal area of the wiper blade 100.

The washer nozzle module 160 includes a nozzle body 161 and nozzle covers 162 that form a washer fluid channel 163 by being vertically combined, that is, the nozzle body 161 and the nozzle covers 162 form the washer nozzle channel 163 therein through which washer fluid can flow, when they are combined.

Two washer fluid channels 163 are formed in parallel inside the washer nozzle module 160, that is, inside the nozzle body 161 and the nozzle covers 162, in the longitudinal direction of the spoiler 130 and the washer nozzle module 160, and nozzles 167 are disposed in the washer fluid channels 163.

That is, the washer nozzle module 160 has two washer fluid channels 163 at left and right sides therein and separate nozzles 167 are disposed in the washer fluid channels 163 so that washer fluid supplied through the washer fluid channels 163 may be independently sprayed.

First, two inlets 164 that communicate with the washer fluid channels 163, respectively, to supply washer fluid to the washer fluid channels 163 are formed at an end of the nozzle body 161 and washer fluid hoses are connected to the inlets 164, so washer fluid supplied through the washer fluid hoses and the inlets 164 can independently flow through the washer fluid channels 163.

One of the two parallel washer fluid channels 163 is provided for supplying washer fluid to be sprayed to a side (left) with respect to the wiper blade 100 and the other one is provided for supplying washer fluid to be sprayed to the opposite side (right) with respect to the wiper blade 100.

Accordingly, when being sprayed through the nozzles 167 in the washer fluid channels 163, washer fluid may be sprayed to both of left and right sides with respect to the wiper blade 100.

Further, two washer pumps that may be independently driven and controlled are disposed in a reservoir keeping washer fluid. Accordingly, when a controller sequentially drives the washer pumps in accordance with the motion direction of the wiper, washer fluid is supplied and sprayed through only the washer fluid channel 163 and its nozzles 167 at the front of the wiper blade 100 that are moving.

In an exemplary embodiment of the present invention, the inlets 164 formed at the nozzle body 161 and the washer fluid hoses connected to the inlets 164 may be disposed inside the wiper arm 90 not to be exposed to the outside for the external appearance.

Further, channel grooves 165 connected with the passages in the inlets 164, respectively, are elongated longitudinally on the inside of the nozzle body 161 (see FIGS. 8, 9, and 12). Accordingly, when the nozzle covers 162 are combined with the nozzle body 161 and cover and seal the bottom of the channel grooves 165, the channel grooves 165 form the washer fluid channels 163 independently sealed by the nozzle cover 162, with the nozzle body 161 and the nozzle covers 162 combined.

The nozzle covers 162 are disposed along the washer fluid channels 163 at the left and right sides on the bottom of the nozzle body 161.

The nozzles 167 for spraying washer fluid protrude on the nozzle cover 162 with predetermined intervals in the longitudinal direction of the nozzle cover 162, spray holes 166 are formed through the nozzle covers 162 with substantially regular intervals, and the nozzles 167 that communicate with the spray holes 166 protrude downward.

Accordingly, when the nozzle body 161 and the nozzle covers 162 are combined as the upper and lower parts, respectively, and the nozzle covers 162 close the bottoms of the channel grooves 165 of the nozzle body 161, the channel grooves 165 of the nozzle body 161 and the nozzle covers 162 form the washer fluid channels 163.

When the nozzle body 161, the nozzle covers 162, and the center spoiler 131 are combined, the nozzles 167 protruding downward from on the nozzle covers 162 are exposed at both sides of the center spoiler 131, so all the nozzles 167 can spray washer fluid downward from the nozzle covers 162.

In the nozzles 167 protruding at both sides of the center spoiler 131, the nozzles at the longitudinal center of the center spoiler 131 are set to spray washer fluid in the longitudinal direction of the wiper blade 100 (center spoiler and nozzle cover), but the other nozzles are set to spray washer fluid at an angle.

That is, the nozzles except the nozzles at the center protrude at an angle from the bottoms of the nozzle covers 162, and particularly, the nozzles protrude at an angle back and forth with respect to the longitudinal direction of the spoiler 130 and the nozzle covers 162, so washer fluid is sprayed at an angle. Accordingly, washer fluid supplied through the washer fluid channels 163 may be sprayed uniformly throughout the entire longitudinal area of the wiper blade 100.

Therefore, when the wiper operates, washer fluid may be sprayed uniformly to the entire wiping area of a glass surface with which the blade rubber 110 of the wiper blade 100 comes in contact, so a necessary minimum amount of washer fluid for washing may be used, thereby minimizing consumption of washer fluid.

On the other hand, as shown in FIGS. 9 to 12, when the nozzle covers 162 to be disposed in parallel in the longitudinal direction of the wiper blade 100 (center spoiler) is coupled to both sides of the bottom of the nozzle body 161, the nozzle covers 162 close the parallel channel grooves 165 of the nozzle body 161.

Further, the nozzle body 161 combined with the nozzle covers 162 is combined with the spoiler 130 in a sliding type to cover the top of the seat 133 of the center spoiler 131, as shown in FIG. 13, and for this combination, seat projections 134 are formed at left and right sides of the seat 133 of the center spoiler 131.

Further, locking-projections 168 that are fitted in between the seat projections 134 and the seating side (the bottom of the washer nozzle module, that is, the side on which the bottom of the nozzle body slides) of the center spoiler 131 are formed at left and right sides on the bottom of the nozzle body 161. Accordingly, when the nozzle body 161 is fitted in the seat 133 of the center spoiler 131 by sliding, the locking-projections 168 are fitted in between the seating side of the center spoiler 131 and the seat projections 134, thereby combining the nozzle body 161 and the center spoiler 131.

To seating the nozzle body 161 in the seat 133 of the center spoiler 131 by sliding, by bringing the bottom of an end of the nozzle body 161 in contact with the seating side of the center spoiler 131 having the shape of an arc and the sliding it thereon, the locking-projections 168 of the nozzle body 161 are fitted in between the seating side of the center spoiler 131 and the seat projections 134, and thus, the nozzle body 161 and the center spoiler 131 are combined.

Further, with the seat projections 134 and the locking-projections 168 are fitted to each other, the nozzle body 161 is exactly disposed in the seat 133 of the center spoiler 131, it is required to longitudinally restrict the nozzle body 161 on the seating side of the center spoiler 131, so a protrusion 135 protruding upward is formed in the seat 133 of the center spoiler 131 for the longitudinal restriction.

Further, a fitting hole 169, in which the protrusion 135 of the center spoiler 131 is inserted when the nozzle body 161 is fully combined at the exact position in the seat 133 of the center spoiler 131, is formed in the nozzle body 161, so when the protrusion 135 of the center spoiler 131 is inserted in the fitting hole 169 of the nozzle body 161, the nozzle body 161 is longitudinally restricted.

Since the wiper blade 100 is achieved by combining the washer nozzle module 160 composed of the nozzle body 161 and the nozzle cover 162 integrally with the center spoiler 131 in this way, washer fluid may be directly sprayed from the wiper blade 100, and particularly, it is possible to selectively spray washer fluid in accordance with the motion direction of the wiper blade 100.

In this configuration, two washer pumps are disposed in the reservoir keeping washer fluid, a sensing unit that can sense the motion direction of the wiper blade 100 is provided, and a controller that selectively drives one of the pumps in accordance with the motion direction of the wiper blade 100 sensed by the sensing unit is provided.

The controller may be a BCM (Body Control Module).

Further, the sensing unit may be any one known in the art as long as it can sense the motion direction of the wiper blade 100, for example, it may be a contact plate.

Therefore, when the controller sequentially drives one by one of the washer pumps in accordance with the motion direction of the wiper blade 100 sensed by the sensing unit, washer fluid is supplied to a washer fluid channel 163 of the washer nozzle module 160 through one of the inlets 164 of the washer nozzle module 160 by a washer pump and the washer fluid supplied through one of the washer channels 163 is sprayed to a glass surface through the spray nozzles 167 of the corresponding nozzle cover 162.

For example, when the wiper blade 100 moves down on a glass surface, washer fluid is pumped up to one of the washer fluid channels 163 and sprayed downward through the nozzles 167 at a side (nozzles protruding downward). In contrast, when the wiper blade 100 moves up on a glass surface, washer fluid is pumped up to the other one of the washer channels 163 and sprayed upward through the nozzles 167 at the opposite side (nozzles protruding upward).

This is an example of sequentially pumping up and spraying washer fluid, using both of the washer fluid channels 163 by sequentially driving two washer pumps in accordance with the motion direction of the wiper blade 100, and when necessary, it is possible to spray washer fluid in only one direction.

That is, when the wiper blade 100 moves up, one of the washer pumps is driven so that washer fluid is sprayed through the nozzles 167 protruding upward, and when the wiper blade 100 moves down, washer fluid is not sprayed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wiper blade with integral washer nozzles including a blade rubber for wiping a glass of a vehicle, a spoiler combined with a retainer of a wiper arm, secondary levers directly connected to the spoiler, and yokes directly connected to the secondary levers, respectively, and supporting the blade rubber, the wiper blade comprising:
a washer nozzle module integrally directly connected to the spoiler and spraying washer fluid supplied through washer fluid hoses in two directions with respect to the spoiler,
wherein the washer nozzle module has washer fluid channels formed therein in a longitudinal direction of the spoiler to spray the washer fluid in two directions, nozzles formed along the washer fluid channels and spraying the washer fluid supplied through the washer fluid channels, and inlets communicating with the washer fluid channels, respectively, and connected with the washer fluid hoses for supplying the washer fluid.

2. The wiper blade of claim 1, wherein the washer nozzle module includes a nozzle body and a nozzle cover that form the washer fluid channels by being combined with each other, parallel channel grooves that communicate with the inlets, respectively, are formed on the nozzle body, and the nozzle cover is combined with the nozzle body and covers bottoms of the channel grooves so that the channel grooves are sealed by the nozzle cover to form the washer fluid channels.

3. The wiper blade of claim 2, wherein the nozzles protruding for spraying the washer fluid are formed with predetermined intervals on the nozzle cover and arranged at both sides of the spoiler to spray the washer fluid downward from the nozzle cover.

4. The wiper blade of claim 3, wherein the nozzles are set to spray the washer fluid at an angle back and forth with respect to the longitudinal direction of the nozzle cover.

5. The wiper blade of claim 2, wherein the nozzle body is integrally combined with the spoiler.

6. The wiper blade of claim 1, wherein the washer fluid hoses through which the washer fluid is supplied by pumps that are independently driven and controlled are connected to the inlets, respectively, so the washer fluid is sprayed through only the nozzles in any one of the two washer fluid channels while the washer pumps are sequentially driven in accordance with a motion direction of the wiper blade.

7. The wiper blade of claim 1, wherein the washer nozzle module is coupled to a top of the spoiler and a seat in which the washer nozzle module is seated is formed in a shape of a groove longitudinally on a top of a center spoiler.

8. The wiper blade of claim 7, wherein the washer nozzle module is seated in the seat of the spoiler by sliding, seat projections are formed on left and right sides of the seat, locking-projections protrude inward at left and right sides of a bottom of the washer nozzle module, so the washer nozzle is combined by sliding such that the locking-projections are fitted in between the seat projections and a seating side of the seat on which the bottom of the washer nozzle module slides.

9. The wiper blade of claim 8, wherein when the washer nozzle module is combined by sliding, with the locking-projections fitted in between the seating side and the seat projections, a protrusion form in the seat of the spoiler is inserted in a fitting hole of the washer nozzle module to restrict the washer nozzle module.

* * * * *